United States Patent [19]
Flaherty et al.

[11] Patent Number: 5,776,213
[45] Date of Patent: Jul. 7, 1998

[54] RESPIRATORY FILTER AND SAMPLING DEVICE

[75] Inventors: Dennis K. Flaherty, Ballwin, Mo.; Russell P. Gordon, Campbell; Paul M. Taylor, Saratoga, both of Calif.; Frank D. Zielinski, St. Louis, Mo.

[73] Assignee: Monsanto Company, St. Louis, Mo.

[21] Appl. No.: 831,573

[22] Filed: Apr. 9, 1997

Related U.S. Application Data

[62] Division of Ser. No. 324,072, Oct. 14, 1994, Pat. No. 5,651,810.

[51] Int. Cl.$^6$ .................................................. B01D 35/30
[52] U.S. Cl. ........................ 55/482; 55/485; 55/486; 55/491; 55/496; 55/DIG. 33; 55/DIG. 35; 96/138; 96/151; 128/202.27; 128/206.17
[58] Field of Search ................... 55/318, 496, 484–487, 55/516–518, 480, 475, 479, 422, 491, 498, 350.1, DIG. 5, DIG. 33, DIG. 35; 95/118, 274, 286, 287; 96/131, 132, 138, 151, 154; 128/202.27, 206.12, 206.16, 206.17, 206.19

[56] References Cited

U.S. PATENT DOCUMENTS

| | | | |
|---|---|---|---|
| 1,003,302 | 9/1911 | Weber-Stierlin | 55/518 X |
| 1,499,864 | 7/1924 | Gordon | 55/518 X |
| 1,866,659 | 7/1932 | Little, Jr. | 210/689 |
| 2,000,064 | 5/1935 | Cover | 55/DIG. 35 |
| 2,111,995 | 3/1938 | Schwartz | 128/206.16 |
| 2,139,137 | 12/1938 | Schwartz | 128/206.16 X |
| 2,325,657 | 8/1943 | Burkness | 210/134 |
| 2,744,523 | 5/1956 | Malcolm, Jr. et al. | 128/206.17 |
| 3,348,692 | 10/1967 | Balogh | 210/266 |
| 3,893,458 | 7/1975 | Fletcher et al. | 55/DIG. 35 |
| 3,944,403 | 3/1976 | Simpson et al. | 55/DIG. 35 |
| 4,141,703 | 2/1979 | Mulchi | 55/527 X |
| 4,179,274 | 12/1979 | Moon | 55/DIG. 35 |
| 4,261,715 | 4/1981 | Frantz | 55/475 X |
| 4,396,206 | 8/1983 | Tsuge et al. | 280/711 |
| 4,530,706 | 7/1985 | Jones | 55/DIG. 35 |
| 4,553,986 | 11/1985 | Ciliberti et al. | 55/523 X |
| 4,619,672 | 10/1986 | Robertson | 55/485 X |
| 4,801,313 | 1/1989 | Mann | 55/500 X |
| 4,839,331 | 6/1989 | Maroldo et al. | 502/416 |
| 4,867,770 | 9/1989 | Feeney | 55/475 X |
| 5,145,494 | 9/1992 | Sowinski | 55/486 |
| 5,226,412 | 7/1993 | Winters | 128/206.12 |
| 5,505,197 | 4/1996 | Scholey | 128/202.27 X |
| 5,651,810 | 7/1997 | Flaherty et al. | 95/287 |

FOREIGN PATENT DOCUMENTS

| | | | |
|---|---|---|---|
| 837375 | 6/1981 | U.S.S.R. | 55/485 |

OTHER PUBLICATIONS

SUPELCO Catalog, pp. 2, 3, 13 and 22. Undated.
LAB SAFETY SUPPLY Catalog, pp. 73–93. Undated.

*Primary Examiner*—Richard L. Chiesa
*Attorney, Agent, or Firm*—Jon H. Beusen; Arnold, White & Durkee

[57] ABSTRACT

A combination respiratory filter and sampling device has been developed which collects airborne contaminants for respiratory exposure measurements. The devices, which fit existing commercial half-mask respirators, are generally smaller and lighter in weight than existing filters, and have low resistance to airflow, so they can be comfortably worn by people performing their normal work duties. Each device consists of at least a front, a middle and a back section which can be independently separated and analyzed by traditional laboratory techniques. The filtering and sampling media thicknesses and types can be adapted to target specific compounds.

12 Claims, 16 Drawing Sheets

| FLOWRATE | | PRESSURE DROP WITH FILTER (INCHES H$_2$O) | PRESSURE DROP WITHOUT FILTER (INCHES H$_2$O) | NET FILTER PRESSURE DROP (INCHES H$_2$O) |
|---|---|---|---|---|
| (SCFH) | (L/M) | | | |
| 0 | 0.00 | 0.00 | 0.00 | 0.00 |
| 10 | 4.70 | 0.15 | 0.05 | 0.10 |
| 20 | 9.40 | 0.38 | 0.10 | 0.28 |
| 30 | 14.10 | 0.42 | 0.18 | 0.24 |
| 40 | 18.80 | 0.60 | 0.25 | 0.35 |
| 50 | 23.50 | 0.80 | 0.35 | 0.45 |
| 60 | 28.20 | 1.02 | 0.50 | 0.52 |
| 70 | 32.90 | 1.30 | 0.65 | 0.65 |
| 80 | 37.60 | 1.52 | 0.80 | 0.72 |
| 90 | 42.30 | 1.80 | 0.92 | 0.88 |

SPRAY MEDIUM: ROUNDUP® (6.25%)
FILTER: RU-112191-021
FLOWRATE: 12 LITERS/MINUTES

DROPLET DIAMETER, MICRONS
COLLECTION EFFICIENCY (%)

RESPIRATORY FILTER AND SAMPLING DEVICE

This application is a division of application Ser. No. 08/324,072, filed Oct. 14, 1994, now U.S. Pat. No. 5,651,810.

BACKGROUND OF THE INVENTION

The present invention is directed to a combined filter and sampler. In particular, the present invention is directed to a combined respiratory filter and sampling device which provides good filtering characteristics and improved sampling capabilities in a single device.

Known air sampling methods for predicting human exposure include several techniques. Passive samplers are typically patches or disks which can be pinned to workers' clothing or affixed to structures. These samplers operate by absorbing materials brought to them by air currents and by diffusion through the air. No controls or measures of the airflow are available, so results will depend on where the sampler is placed and how it is used. Therefore, human exposure, and in particular respiratory exposure, to particle-laden flows can be misleading because the particle trajectories for a passive sampler will differ from trajectories where air is respired.

Active samplers typically consist of a fixed flowrate pump, filter, a pre-filter if desired, and a power supply. The pump draws air through the filter at a prescribed, constant rate for a given period. Human respiratory exposures are estimated from the levels of contamination that remain trapped on the filter. If particle-laden flows are to be analyzed, a cyclone device can be placed ahead of the filter. The cyclone selectively prevents particles above a given size from entering the filter.

Generally, two types of active samplers are available: high volume and personal. Personal air samplers are typically designed to be portable and usually consist of a pump and a filter in combination. The pumps draw 0.5-1.0 liters per minute through tubular filters. The filters can be pinned to a user's lapels, and the pump hung from a belt. High volume air samplers draw much higher flowrates of air, but require large power supplies and are typically fixed in position.

Existing active samplers, however, also have their own shortcomings. Active samplers are designed to estimate the average concentration of contaminants in the air, and not what a person in such an environment would have respired. Existing personal air samplers often draw an order of magnitude less air than a human would and are not positioned at the face, where actual exposure would occur. Active samplers work well when contaminants are vapors and exposure is constant and uniform, but during episodic or non-uniform exposure conditions, these samplers may not accurately portray the levels of exposure during the workday. Additionally, high volume air samplers are not suitable for environments where the worker is in motion over an extended area.

Several conventional mask filters are commercially available to trap contaminants and prevent their respiration. Conventional mask filters are, however, constructed with a single purpose in mind, to absorb as much material as possible in the most cost effective manner possible. These filters do not have the dual purpose of providing both an adequate respiratory filtering mechanism and providing the filtering capability in a structure that optimizes the way materials are trapped by the filter to enable accurate and efficient subsequent chemical analysis. Additionally, conventional mask filters are not designed for ready disassembly into component parts for chemical analysis.

Many existing mask filters are rather large or bulky due to the absorption materials used and the way in which they are arranged. This leads to filters which are heavy and either cumbersome or uncomfortable for a user particularly over long periods of time. As a result, a user may choose to forego the protection that such mask filters provide rather than tolerate these inconveniences.

It is apparent, therefore, that there exists a need for a combination respiratory filter and sampling device the provides filtering capabilities at least equal to existing filters while at the same time providing sampling capabilities far superior to known sampling devices.

SUMMARY OF THE INVENTION

It is an object of the present invention to provide a combined filtering and sampling device.

It is a further object of the present invention to provide a combined filtering and sampling device having a plurality of filtering and collection media layers in a stack, in which each layer may be individually removed from the stack for analysis without disassembly of the entire stack.

Generally speaking, this invention fulfills the above-described and other objects of the invention by providing a sampling and filtering device comprising a first end member, a second end member in operative alignment with the first end member, first sampling and filtering means interposed intermediate the first and second end members and in operative alignment therewith. First adjustable connecting means capable of engaging the first end member and the first sampling and filtering means and second adjustable connecting means capable of engaging the second end member and the first sampling and filtering means are provided whereby adjustment of the first and second connecting means in opposing directions allowing the removal of any one of the end members or the sampling and filtering means without removal of any of the other of the end members or the sampling and filtering means.

In preferred embodiments of the prevent invention, the connecting members are screws.

In a preferred embodiment of the invention, the sampling and filtering media samples and filters Alachlor.

In another preferred embodiment of the invention, the sampling and filtering media samples and filters Glyphosate.

This invention further fulfills the above-described needs in the art by providing a method of removing any layer from a multilayer combined sampling and filtering device which device comprises first and second end members, first and second sampling and filtering means intermediate the first and second end members and first and second adjustable connecting means engaging first and second and members and the first and second sampling and filtering means. The method comprises the steps of adjusting the first connecting means in one direction thereby disengaging the first connecting means from the first sampling and filtering means, adjusting the second connecting means in a direction opposite the direction of adjusting the first connecting means thereby disengaging the second connecting means from the first sampling and filtering means and removing the first sampling and filtering means.

These and other features and advantages of the present invention will be described in detail with reference to the following drawings, wherein:

BRIEF DESCRIPTION OF THE DRAWINGS

FIG. 13 is a table of pressure drop measurements of a Glyphosate filter of the present invention.

FIG. 14 is a graph of particle size versus collection efficiency for a Glyphosate filter of the present invention.

DETAILED DESCRIPTION OF THE INVENTION

A respiratory filtering device is a device designed to condition air prior to inhalation. In particular, a respiratory filtering device generally includes one or more layers of a medium which may have a pore size smaller than the average size of an undesirable particular for trapping the particulate matter and to thereby prevent respiration thereof. Alternatively, the medium may have a chemical impregnated therein which can effectively absorb or neutralize an undesirable contaminant. Typical respiratory filters are effective for a limited exposure time after which they are disposed of as a unit. Sampling devices, on the other hand, trap contaminants for analysis in situ or at a later time. Therefore, portable sampling devices must be amenable to at least partial disassembly or interfacing with a chemical analyzer, such as, for example, a mass spectrometer.

A combined filtering and sampling device must, therefore, provide the functions of both conditioning the air to be respired and be capable of disassembly for analysis. Furthermore, for such a device to be commercially acceptable, it should be lightweight, should not exhibit excessive pressure drop, and should be readily adaptable with conventional face masks.

Figure 1:
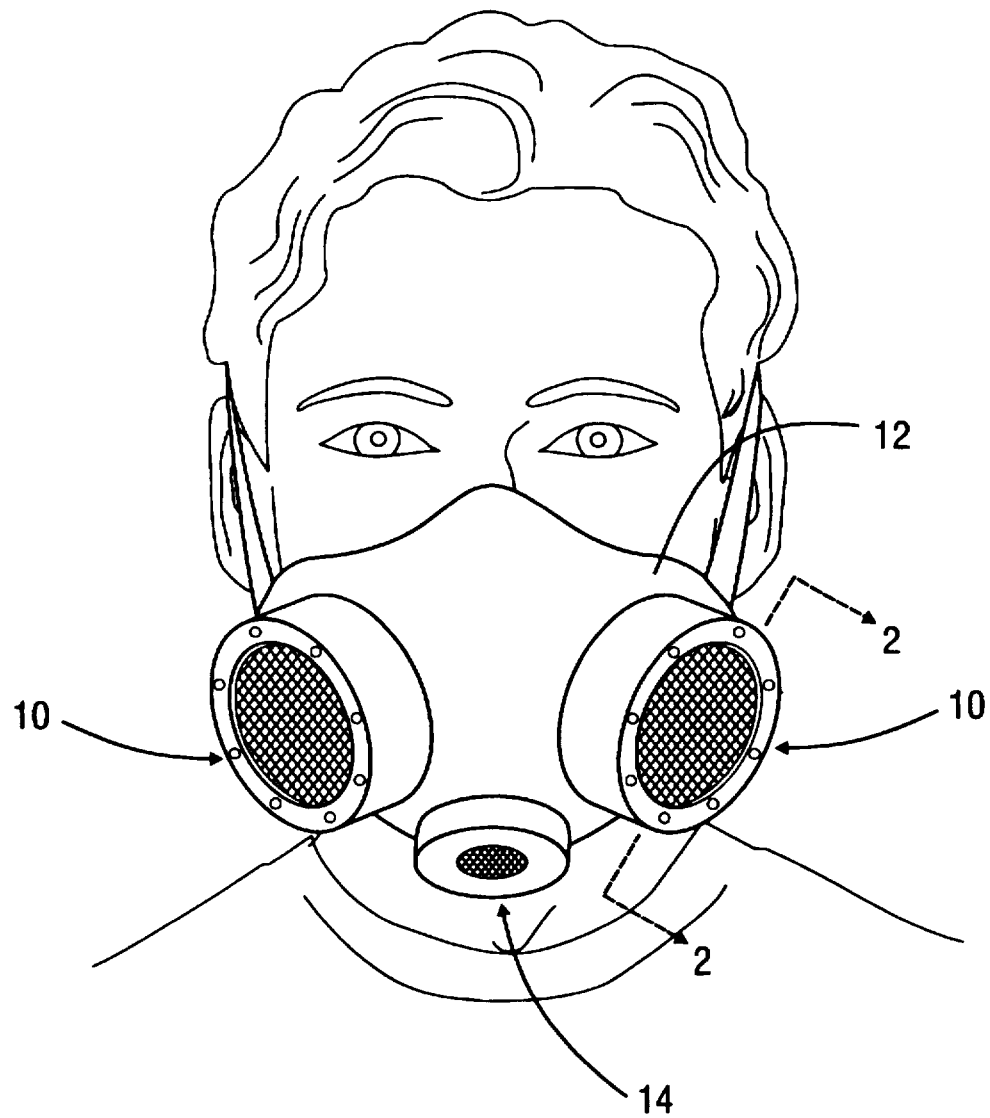
FIG. 1 is a perspective view of a user wearing a filter mask that utilizes the respiratory filter and sampling device of the present invention.

Referring to FIG. 1, respiratory filter and sampling device 10 according to the present invention is illustrated mounted in a conventional filter mask 12. Device 10 is capable of being utilized in conjunction with most commercially available mask filters including half-masks and full face masks. A preferred mask for use with the filtering and sampling device of the present invention is the Survivair Blue 1 manufactured by Lomasec, Inc. The masks capable of being utilized in conjunction with device 10 have a valve such as that generally referred to as 14 in FIG. 1 which controls the flow of air through devices 10. During inhalation, the valve is closed so that all air that is ultimately going to be respired by the user is routed through devices 10. During exhalation, valve 14 opens to allow exhaled air to bypass devices 10. The sampling and filtering media of devices 10 can be removed for analysis and measurement to determine exposure levels as will be described below. When the Survivair Blue 1 face mask is utilized, two sampling and filtering devices 10 are placed on the mask. Total exposure levels are then determined by combining the analysis data from the two devices. The resistance to airflow of a mask, such as mask 12, with two devices 10 attached thereto, will be one-half that of a mask with one device 10, allowing the wearer to breathe more easily because the resulting pressure drop is not as great.

Figure 2:
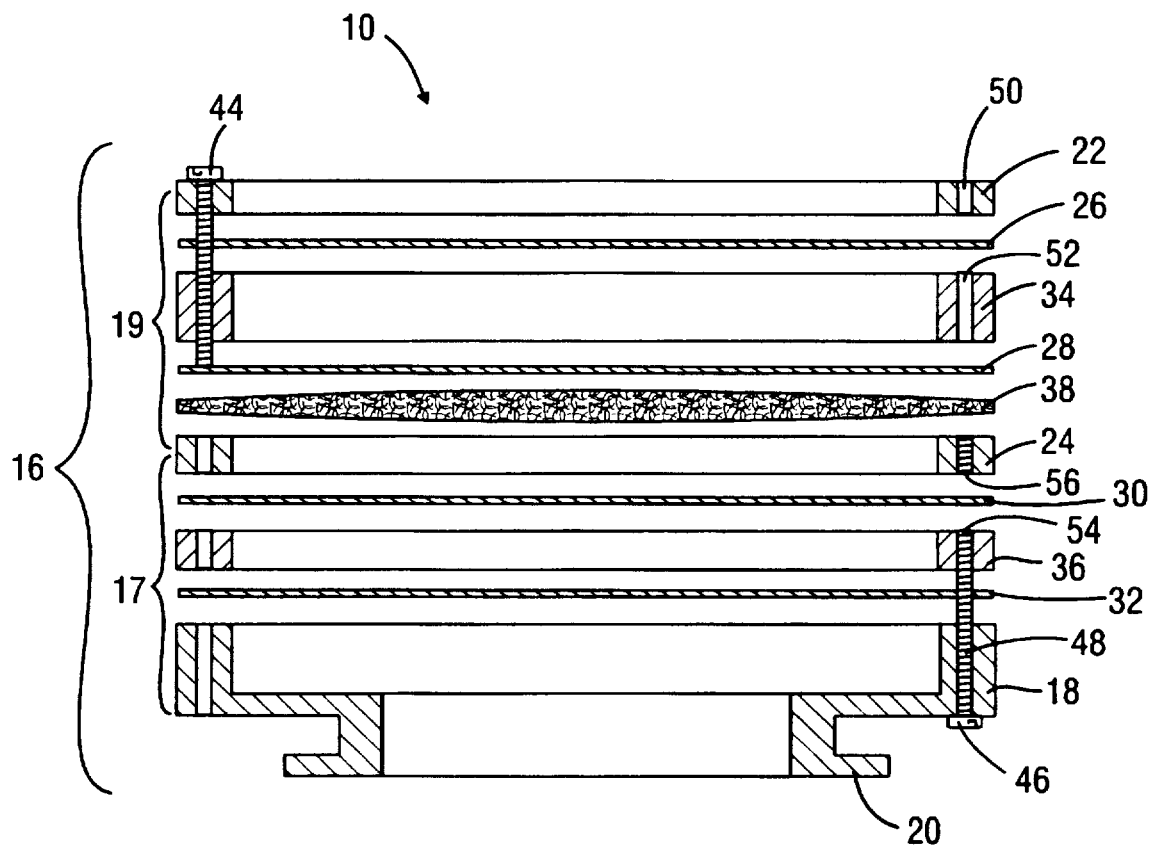
FIG. 2 is a vertical exploded cross sectional view of the component parts of one embodiment of the respiratory filter and sampling device of the present invention taken substantially along line 2—2 of FIG. 1.
Figure 3:
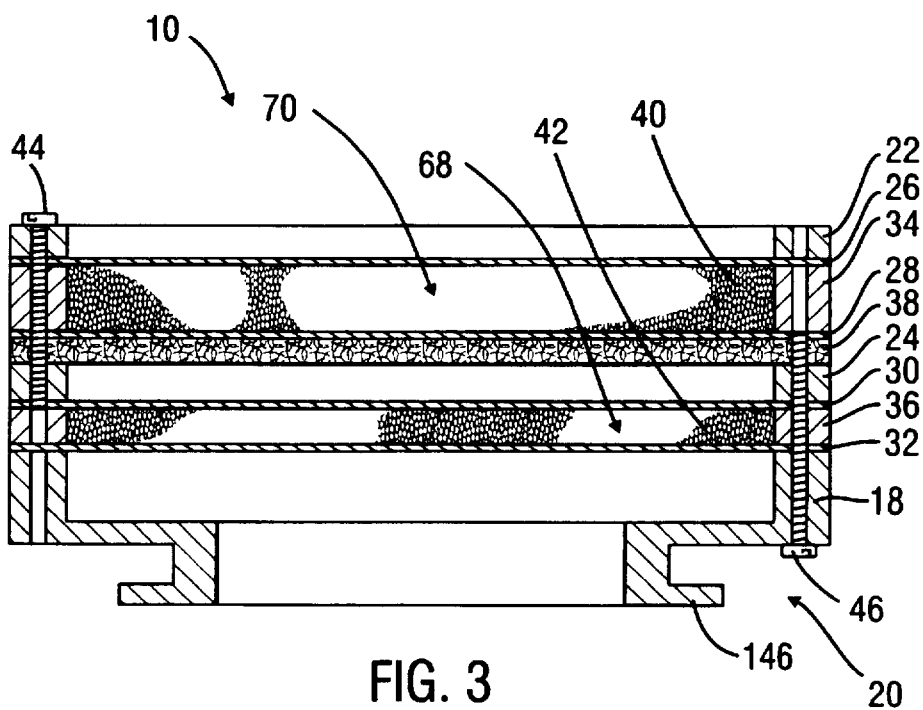
FIG. 3 is a cross sectional view of the respiratory filter and sampling device of one embodiment of the present invention taken substantially along line 2—2 of FIG. 1.
Figure 4:
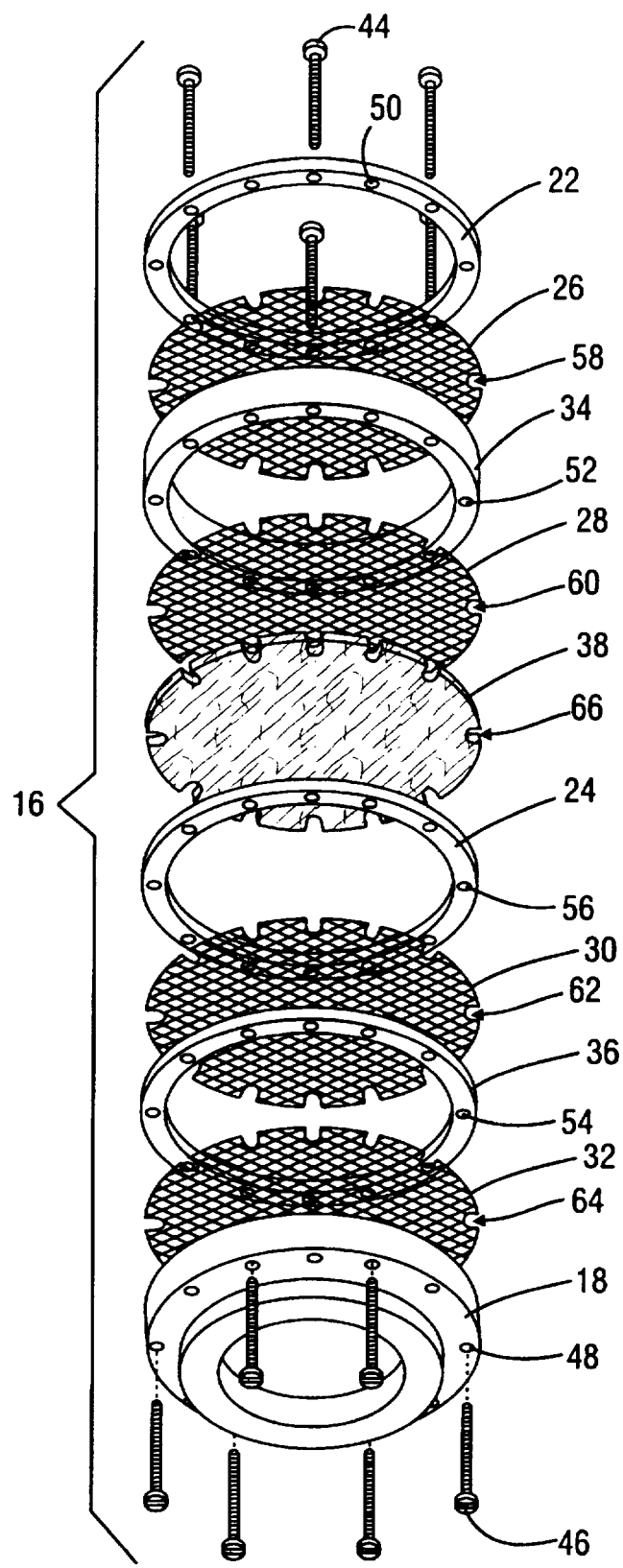
FIG. 4 is an exploded perspective view of one embodiment of the respiratory filter and sampling device of the present invention.

FIGS. 2-4 illustrate a typical assembly of one embodiment of a combined sampling and filtering device 10 according to the present invention. As best shown in FIG. 2, the combined sampling and filtering device 10 is a multilayered device. The number, type, size and composition of the constituent layers of the device 10 vary according to the airborne particulates, droplets, or vapors for which one desires to test or filter. All of the embodiments of the present invention, however, share certain common structural characteristics, as will be discussed below in detail.

It therefore should be appreciated that many different layering combinations and constituents can be used without departing from the spirit and scope of the present invention. Combinations of particular layers found useful in filtering and testing for particular materials will be discussed below. It should further be understood that the information on the materials that can be filtered or isolated for further analysis is for exemplary purposes only and is by no means meant in any way to be construed as limiting the materials that can be filtered or isolated by the present invention or the types or combinations of materials that can be used to isolate or filter particular elements.

The structure of device 10 is adaptable to receive a wide range of filtering and sampling media. Commercially available filtering and sampling media such as fiberglass or HEPA pads may be placed within or between the spacers. In addition, particulate-type sampling and filtering media such as activated carbon, molecular sieve material or silica gel may be placed within the spacers and held in place by wire mesh screens in a layer having a uniform thickness. Depending upon the type of contaminant sought to be tested for or filtered out, the wire screens may also act as a collection media, as by the process of adsorption. Chemicals collected by the screens may be detected by analysis and combined with the data obtained from analysis of the sampling and filtering media to determine total exposure levels. By choosing an appropriate number and combination of filtering and sampling media, device 10 can be utilized to sample and filter a wide range of airborne chemical and particulate contaminants.

Figure 15A:
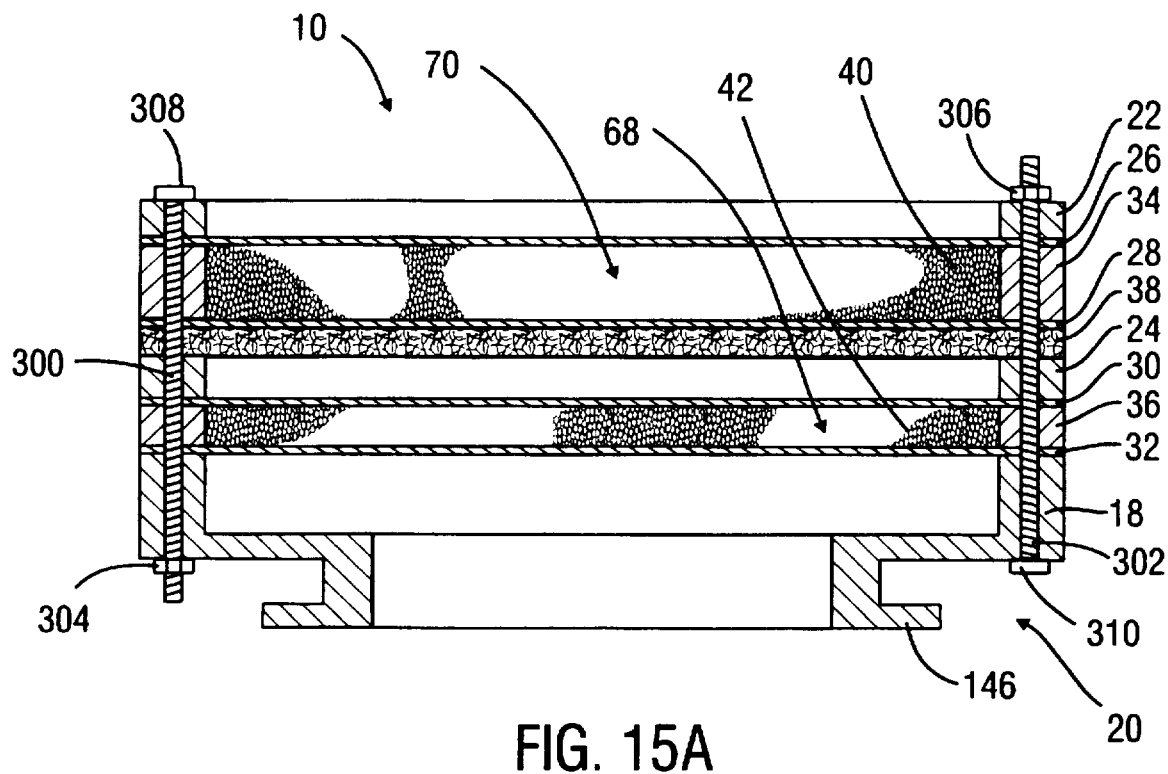
FIG. 15a is a cross-sectional view of the respiratory filter and sampling device of FIG. 15 employing another alternative set of connecting members.
Figure 15:
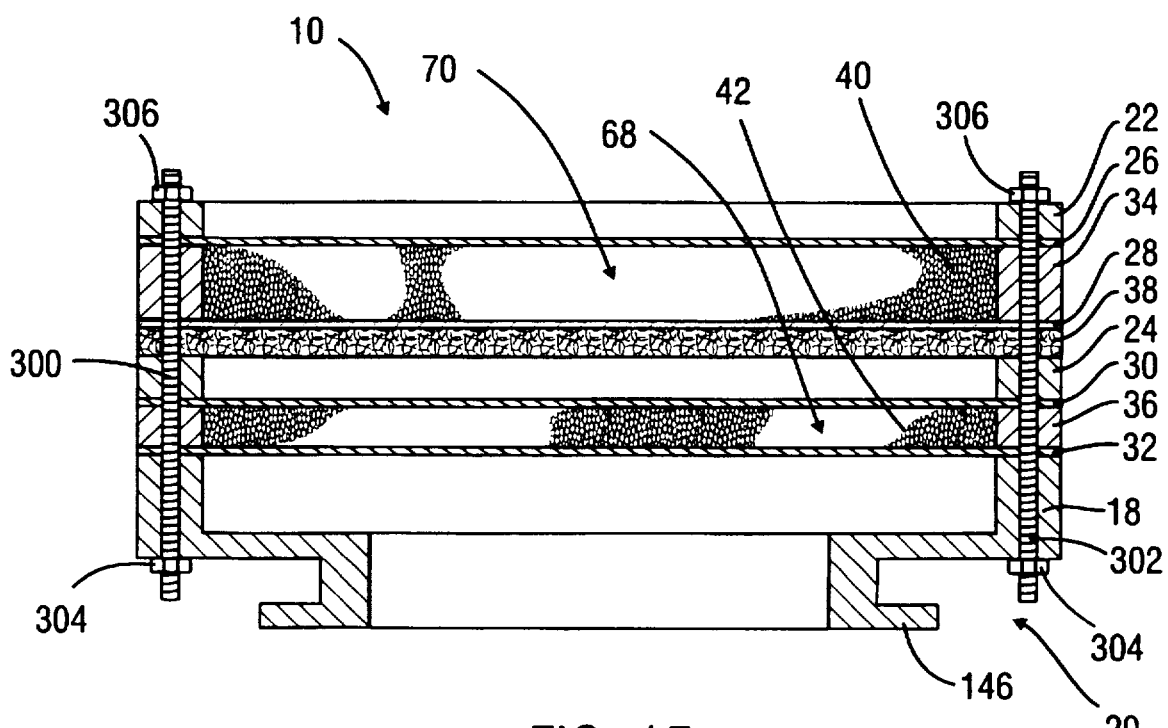
FIG. 15 is a cross sectional view of the respiratory filter and sampling device of FIG. 3 employing an alternative set of connecting members.

A combined sampling and filtering device 10, as shown in FIGS. 2–4, is a multilayer stack 16. Stack 16 comprises first end member 18 including mask adapter 20, second end member 22, and alternating layers of wire mesh screens 26, 28, 30, and 32, spacers 24, 34 and 36, and sampling and/or filtering media 38, 40, and 42 placed between end members 18 and 22. End members 18 and 22 and spacers 24, 34 and 36 may be annular. Stack 16 is held together by adjustable connecting members 44 and 46 which intersect selected layers of stack 16. Connecting members 44 and 46 may be, for example, screws. In one embodiment of the present invention, connecting members 44 and 46 extend oppositely from end members 22 and 18, respectively, toward spacer 24 thereby defining top layer 19 and bottom layer 17. As shown in FIGS. 2–4, connecting members 44 and 46 are screws, and are in threaded engagement with threaded holes 56. Connecting members 44 and 46 allow removal of individual layers of stack 16 without disassembly of the entire stack 16. In one preferred embodiment, as best shown in FIG. 15, connecting members 300 and 302 extend between end member 18 and end member 22 whereby each of connecting members 300 and 302 intersect each layer of stack 16.

First end member 18, second end member 22, and spacers 24, 34 and 36 are preferably manufactured of nylon. Wire mesh screens 26, 28, 30 and 32 are preferably made of stainless steel having a mesh size in the range of about 60 mesh. The stainless steel wire preferably has a diameter of about 0.0075 inches. Connecting members 44 and 46 can be made of stainless steel but are preferably made of nylon, or a similar lightweight durable material, to keep the weight of device 10 to a minimum.

As best shown in FIG. 4, end members 18 and 22, and spacers 24, 34 and 36 are annular members having a number of holes equally spaced about the outer periphery thereof. Holes 48, 50, 52, 54 and 56 in members 18, 22, 34, 36 and 24, respectively, may be through holes or threaded holes or a combination of both depending upon the size and type of connecting members 44 and 46. Screens 26, 28, 30 and 32 include slots or holes 58, 60, 62 and 64, respectively, located about the outer periphery thereof to accommodate connecting members 44 and 46 therethrough. Similarly medium 38 may include slots or holes 66 also located about the outer periphery thereof. Alternatively, medium 38 may have a diameter smaller than spacers 24, 34 and 36 and occupy the entire inner diameter of a single spacer. Screens 26, 28, 30 and 32, end members 18 and 22, and spacers 24, 34 and 36 are of substantially the same outer dimension so that screens 26, 38, 30 and 32 are held taut between members 18 and 22 and spacers 24, 34 and 36. In addition, screens 26, 28, 30 and 32 overlay spacers 24, 34 and 36 and end members 18 and 22 so as to separate spacers 24, 34 and 36, and members 18 and 22, and sampling and filtering media 38, 40 and 42. Maintaining screens 26, 28, 30 and 32 taut also ensures media 38, 40 and 42 are contained within defined areas and in uniformly packed layers.

As described, sampling and filtering device 10 consists of a plurality of distinct layers. Successive layers are built up by interposing between first end member 18 and second end member 22, as required, any number of layers of screens, spacers and sampling and filtering media, one on top of the other and in operative alignment with each other. The layers are then secured, as described, utilizing connecting members such as connecting members 44 and 46, which may screws. In accordance with this invention, connecting members, such as connecting members 44, are adjustably removable by sliding in one direction while connecting members such as connecting members 46 are adjustably removable by sliding in a second direction opposite to the direction of sliding of connecting members 44.

With reference to device 10 as shown in FIGS. 2–4, a typical construction sequence for bottom layer 17 is as follows. To begin with, screen 32 is placed on first end member 18 in operative alignment therewith and with holes or slots 64 aligned with holes 48. Spacer 36 is then placed on screen 32 in operative alignment therewith and with holes 54 aligned with holes 64 thereby creating receptacle 68 for sampling and/or filtering media. Sampling and/or filtering media 42 is next placed in receptacle 68. Screen 30 is then placed on spacer 36 in operative alignment therewith and with holes 62 aligned with holes 54 thereby forming a cover for receptacle 68 and for maintaining a uniform layer of media 42. Additionally, spacer 24 is placed on screen 30 in operative alignment therewith and with holes 56 in alignment with holes 62. Connecting members 46 are then inserted into every other hole of holes 48 and then engaged with the correspondingly aligned holes of holes 64, 54, 62 and 56. In the embodiment of the present invention, shown in FIGS. 2–4, connecting members 46 are screws and holes 56 are threaded, and connecting members 46 are tightened into threaded engagement with holes 56.

A typical construction sequence for top layer 19 on top of bottom layer 17 is as follows. HEPA pad 38, or other sampling and/or filtering media, is placed on top of spacer 24 in operative alignment therewith and with holes 66 aligned with holes 56. Screen 28 is then positioned on pad 38 in operative alignment therewith and with holes 60 aligned with holes 66. Spacer 34 is then located on screen 28 in operative alignment therewith and with holes 52 aligned with holes 60 thereby creating receptacle 70. Sampling and/or filtering media 40 is then placed in receptacle 70. Screen 26 is then positioned on spacer 34 in operative alignment therewith and with holes 58 aligned with holes 52 thereby forming a cover for receptacle 70. Second end member 22 is then placed on screen 26 in operative alignment therewith and with holes 50 aligned with holes 58. Connecting members 44 are then inserted through every other hole of holes 50 and then engaged with the correspondingly aligned holes of holes 58, 52, 60, 66 and 56 in a direction opposite to that of connecting members 46. Connecting members 44, which are screws, are then tightened into engagement with threaded holes 56.

In addition to the above possible construction sequences for device 10, connecting members 44 and 46 may be used as alignment tools as each layer is placed on top of the other. Furthermore, while placing sampling and/or filtering media into receptacles 68 and 70, such as a particulate type sampling and/or filtering media, it may be advantageous to utilize clamps to keep spacers 34 and 36 compressed against the adjacent screen and to thereby prevent the particulate from getting between the spacer and the screen.

In the embodiment shown in FIGS. 2–4, and as just described, connecting members 44 and 46 are removable in opposing directions. Connecting members 44 are removable only through end member 22 while connecting members 46 are removable only through end member 18. Stack 16 is a single integrated sampling and filtering device because both sets of connecting members 44 and 46 are in threaded engagement with spacer 24. The opposing relation of connecting members 44 and 46 permits the layers of sampling and/or filtering media 38, 40 and 42 to be independently separated from device 10 for analysis by standard laboratory techniques. It is to be noted that connecting members 44 and 46 engage alternating holes of holes 56.

To remove any single layer from stack 16, connecting members 44 or 46 are disengaged from threaded holes 56 and slidably adjusted to free the desired layer. For instance, to remove medium 38, loosen connecting members 44 to disengage them from threaded holes 56. Adjust connecting members 44 by sliding and lifting second end member 22, screen 26, spacer 34 and screen 28, as a unit, off spacer 24 and remove sampling and/or filtering medium 38. To remove sampling and/or filtering medium 42, turn device 10 so that first end member 18 is facing up to prevent media 48 from falling out. Loosen connecting members 46 to disengage them from threaded holes 56. Slidably adjust connecting members 46 to allow screen 30, spacer 36 and screen 32 to be removed as a unit. As described, any individual layer of stack 16 may be removed without disturbing every other layer.

To prevent air leakage from between the spacers, a sealing element such as, for example, plastic adhesive tape, not shown in the drawings, is wrapped around the periphery of the assembled device 10. Alternatively, a compound which would provide an airtight seal, yet still allow disassembly of device 10, such as a silicon gel, could be placed between the spacers.

In a preferred embodiment of the present invention, as shown in FIG. 15, device 10 is altered by utilizing connecting members 300 and 302. Connecting members 300 and 302 intersect each layer of stack 16 providing great flexibility in removing any single layer of stack 16. Connecting members 300 and 302 may be smooth rods or threaded rods. Retaining members 304 and 306 may be elements, such as clips or threaded nuts, which attach to the ends of connecting members 300 and 302 respectively, and apply compressive loads to stack 16. The compressive loads serve to hold the individual elements in stack 16 together tightly. Alternatively, connecting members 300 and 302 may be conventional screws with heads 308 and 310 respectively in which case members 300 and 302 are inserted in alternating holes and extend in either the same direction, or in opposite directions as illustrated in FIG. 15a.

In the embodiment illustrated in FIG. 15 where connecting members 300 and 302 are rod-like members without a head, retaining members 304 and 306 can be removed from alternate connecting members 300 and 302, to enable sliding adjustment of connecting members 300 and 302 in opposing directions. This is accomplished by initially removing a first retaining member 304 from a first connecting member 300. A second retaining member 306 is then removed from a second connecting member 302 adjacent first connecting member 300. One then proceeds in this alternating manner until all connecting members 300 are free to slidably adjust in one direction and all connecting members 302 are free to slidably adjust in the direction opposite that of connecting members 300.

With further reference to FIG. 15, layer 34 may be removed by disengaging connecting members 300 and 302 from selected layers of stack 16 by slidably disengaging connecting members 300 and 302 in opposite directions, as follows. Retaining members 304 are first removed from connecting members 300. Connecting members 300 are then disengaged from each layer of stack 16 except layer 22. Retaining members 306 are then removed from connecting members 302. Connecting members 302 are disengaged from member 22, screen 26, spacer 34 and screen 28. Spacer 34, along with screens 26 and 28, are now free from connecting members 300 and 302 to be removed.

To remove medium 38, disengage connecting members 300 from end member 18, screen 32, spacer 36, screen 30, spacer 24 and medium 38. Connecting members 300 remain engaged with screen 28, spacer 34, screen 26 and end member 22. Disengage connecting members 302 from end member 22, screen 26, spacer 34, screen 28 and medium 38. Connecting members 302 remain engaged with spacer 24, screen 30, spacer 36, screen 32 and end member 18. Medium 38 is free from connecting members 300 and 302 and may be removed from stack 16.

Referring now to FIG. 15a, a preferred form of the present invention is shown including connecting members 300 and 302 which may be conventional screws having heads 308 and 310 respectively. As in the other embodiments, holes 48, 50, 52, 54 and 56 may be through holes or threaded holes, or a combination of both. Retaining members 304 and 306 may be utilized at one end only of connecting members 300 and 302 as required to compress the members of device 10. Removal of any one or more layers from device 10, as shown in FIG. 15a, would be accomplished much the same as for removal of any one or more layers from device 10 as shown in FIG. 15. Of course, however, connecting members 300 are restricted to removal, by sliding, in only one direction. Similarly, connecting members 302 are restricted to removal in only one direction, by sliding, in the same or opposite direction from connecting members 300 depending upon installation.

Figure 5:
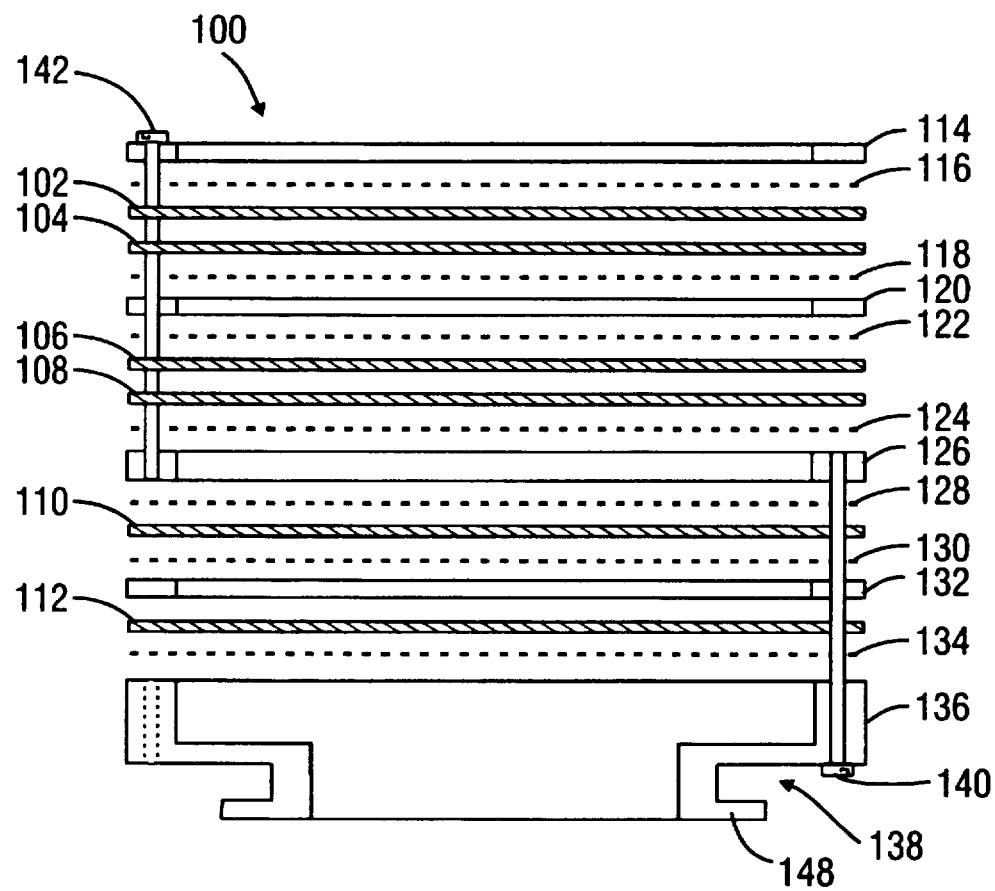
FIG. 5 is a vertical exploded sectional view of a second embodiment of the respiratory filter and sampling device of the present invention.

A second embodiment of a combined sampling and filtering device according to the present invention is shown generally as 100 in FIG. 5. Device 100 is generally similar to device 10 and comprises first end member 136 including mask adapter 138, second end member 114 and spacer 126. Interposed between second end member 114 and spacer 126 are screens 116, 118, 122 and 124, fiberglass pads 102, 104, 106 and 108 and spacer 120. Interposed between first end member 136 and spacer 126 are screens 128, 130 and 134, fiberglass pad 110, mist pad 112 and spacer 132. End members 114 and 136 and spacers 120, 126 and 132 may be annular and include several through holes or threaded holes equally spaced about the periphery thereof as in device 10. Device 100 is held together by connecting members 140 and 142 in similar fashion to connecting members 44 and 46 or 300 and 302 of device 10. Assembly and disassembly of device 100 is carried out in a manner similar to that for device 10. The end members, spacers and screens of device 100 are made of the same type of materials as device 10.

It is to be noted that any combination of screens, spacers and sampling and filtering media may be interposed between the main structural components hereinbefore generally referred to as a first end member, second end member and spacers. Thereby, a combined sampling and filtering device may be provided for sampling and filtering many known types of pesticides, toxins or other airborne contaminants simply by building up the required type and number of sampling and filtering media.

Figure 16:
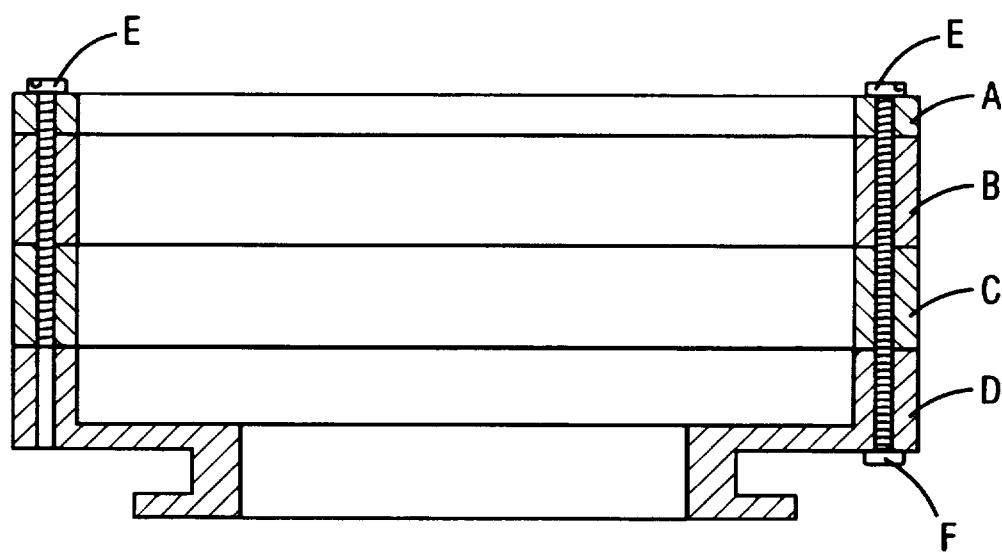
FIG. 16 is a cross-sectional view of a four layer sampling and filtering device of the present invention utilizing long and short connecting members.

In addition, while the two embodiments of the combined sampling and filtering device of the present invention described herein contain three spacers between the first and second end members, any number of spacers, i.e. two, four, five, six, etc., could be employed. This would provide areas for insertion of additional types and layers of sampling and filtering media. Furthermore, and regardless of the number of spacers or layers of sampling and filtering media employed, connecting members, such as connecting members 44 and 46, 140 and 142 or 300 and 302, may be of varying lengths. For example, a four layer stack, as best illustrated in FIG. 16, may include end members A and D and sampling and filtering media layers B and C intermediate end members A and D. Alternate connecting members of connecting members E may extend through layers A, B and C while the other connecting members of connecting members E extend through only layers A and B. Connecting members F would extend through layers D and C. In such a configuration, therefore, it is possible to disengage the longer connecting members of connecting members E and connecting members F from layer C and remove layer C without disengaging the shorter connecting members of connecting members E. Therefore, the engagement between layers A and B need not be loosened. As those skilled in the art will recognize, the general concept of providing some connecting members which are shorter or longer than others can be carrier out in a variety of ways. This concept can be used in conjunction with a filter having a large number of filtering layers by simply increasing the number of connecting members used therewith.

As illustrated in FIGS. 2–4 and FIG. 5, mask adapters 20 and 138, respectively, include flanges 146 and 148 respectively. Flanges 146 and 148 are designed to be engaged with the filter ports of a conventional filter mask 12 such as the Survivair Blue 1. Alternatively, flanges 146 and 148 may be replaced by a threaded mask adapter for engagement with the filter ports of other conventional filter masks such as a Scott Model 65 Twin Cartridge Respirator.

EXAMPLE 1

In one embodiment of the present invention, the particular combination of layers of filtering media has been found to be particularly effective in filtering Alachlor, the active ingredient in the commercial pesticide Lasso®. This embodiment, illustrated in FIGS. 2–4, includes two silica gel layers 40 and 42 and a particulate collection pad 38. Each layer of silica gel and the particulate collection pad filters and collects, for later analysis, Alachlor in vapor or liquid phase, or attached to particles. Receptacle 70 holds a layer 40 of chemically pure silica gel (SKC Brand, 20/40 available from SKC, Inc.) Silica gel layer 40 is ¼ inch thick and is the primary collection medium. Screens 26 and 28 maintain silica gel layer 40 in receptacle 70 in a uniform layer. Receptacle 68 holds a layer 42 of the same type of pure silica gel in a ⅛ inch thickness. Screens 30 and 32 maintain silica gel layer 42 in a uniform layer within receptacle 68. Layer 42 collects any breakthrough for quantification. Interposed between screen 28 and spacer 24 is a high efficiency collection pad 38, such as a TC-21C-488 available from the 3M Company or similar pad. Pad 38 is used to trap particulate matter. Wire screens 26, 28, 30 and 32 are held taut to ensure that thin, uniform layers of filtering media will result.

Air respired through combined sampling and filtering device 10 is drawn through screen 26 and into and through silica layer 40, the primary collection media, where substantially all of the Alachlor respired is trapped. Air is then drawn through screen 28 and into and through high efficiency collection pad 38 where substantially all particulate matter is trapped. Air is then drawn through screen 30 and into and through silica layer 42 where Alachlor not collected by silica layer 40 is collected to quantify breakthrough.

Testing was performed on device 10 to determine pressure drop across the filter and filtering efficiencies. The pressure drop, reported in FIG. 6 and discussed further below, shows that the device 10 offers low resistance to airflow so that wearers can breathe through the filters without significantly affecting respiration. Filtering efficiencies, as reported in FIGS. 9 and 10 and discussed below, show good results compared to other types of filters.

Figure 6:
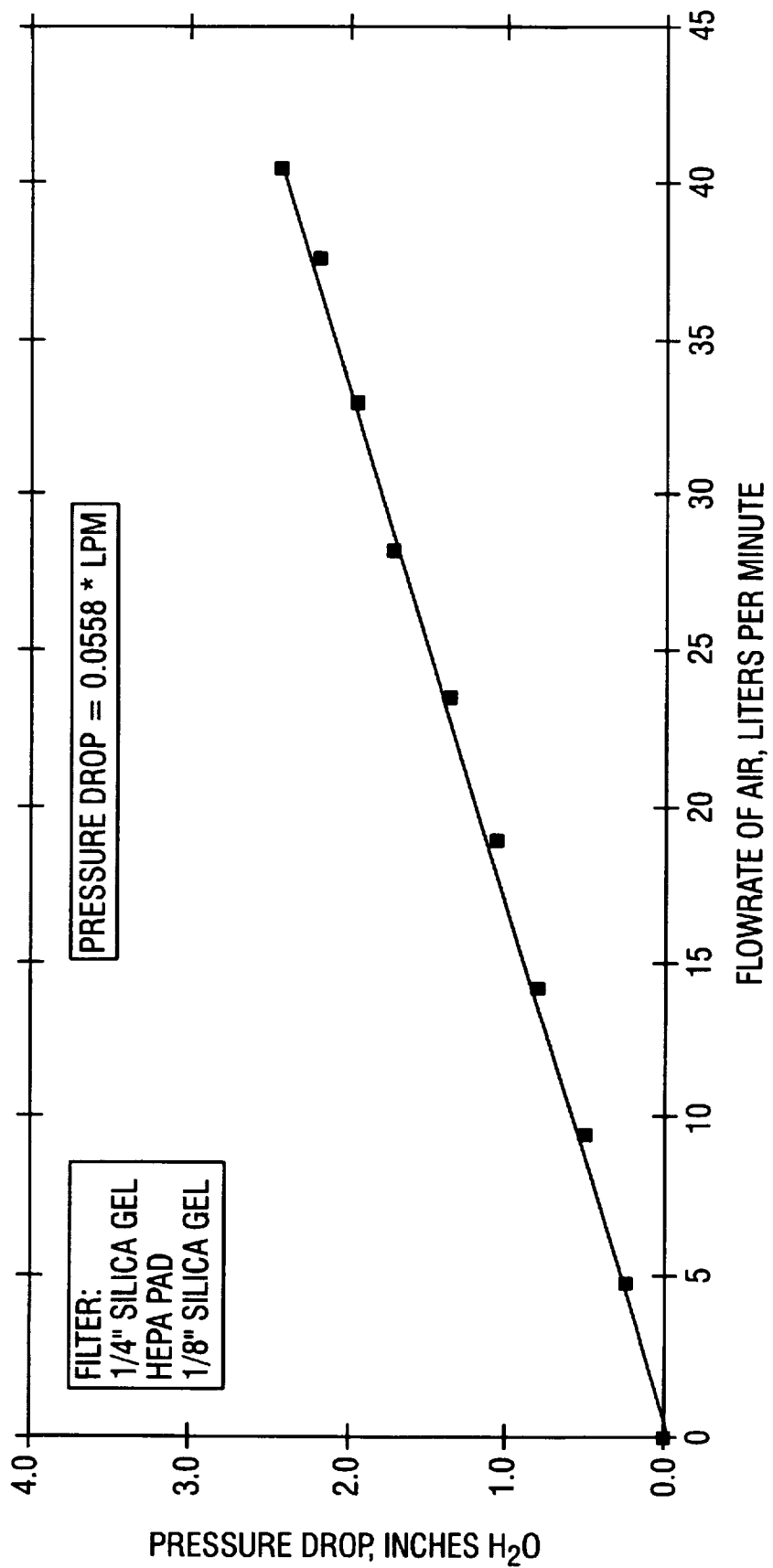
FIG. 6 is a graph of flowrate versus pressure drop for an Alachlor filter of the present invention.
Figure 7:
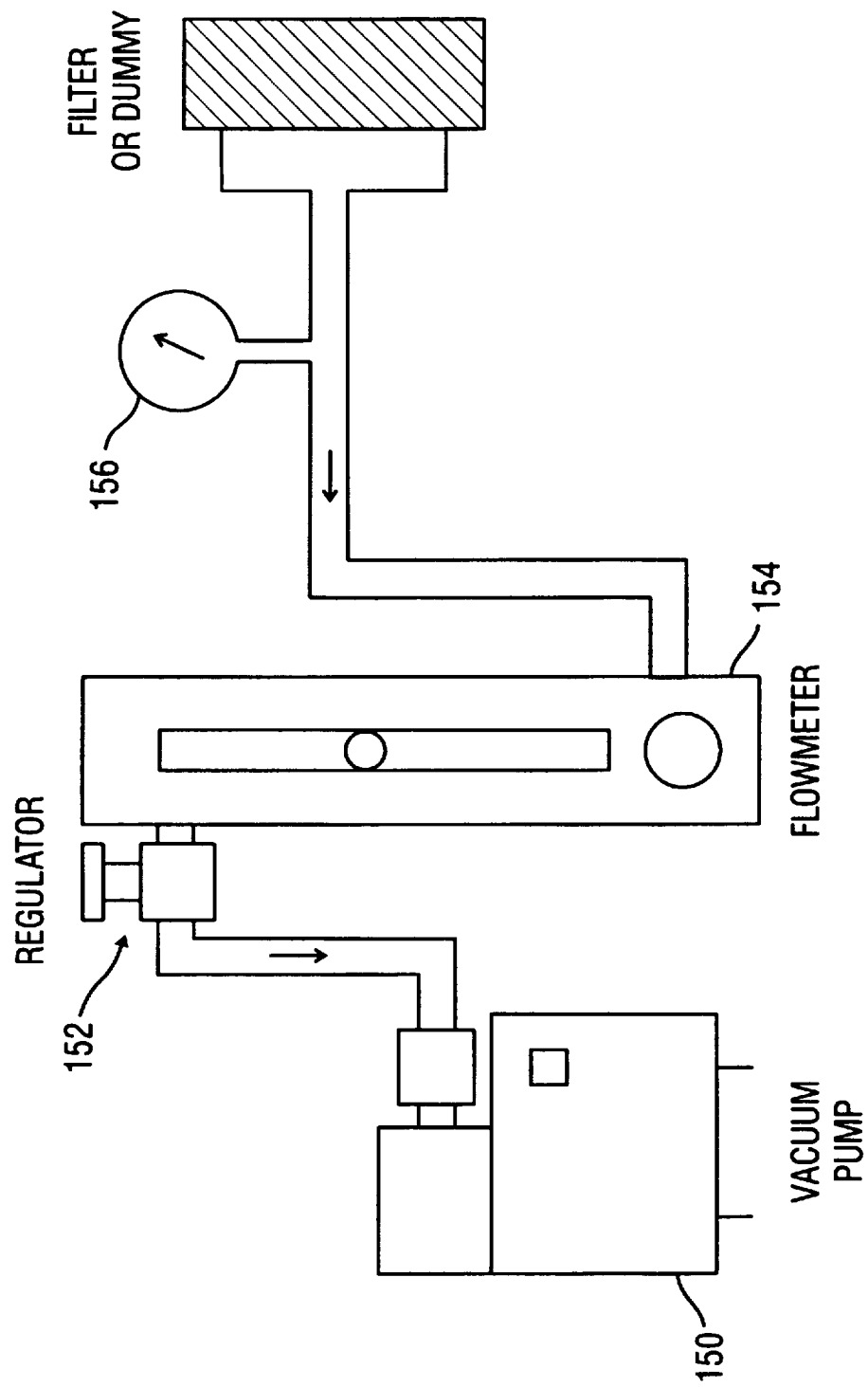
FIG. 7 is a test setup for measuring pressure drop across the filter of the present invention.

Typically, normal resting respiration is approximately 6 liters per minute (lpm) while respiration rates during mild exercise range from about 10 lpm to about 15 lpm. As can be seen in FIG. 6, the pressure drop through a single device 10 at 10 lpm is about ½ inch of water column pressure. This is a low resistance to airflow, thereby allowing wearers to breathe through device 10 without significant adverse affects to their respiration. Lower resistance to airflow, of about ¼ inch of water column pressure, will actually be experienced because two devices 10 are typically utilized with conventional masks such as mask 12. Human factors studies conducted by the applicants indicate that the pressure drop measured across device 10 is comparable with commercially available conventional filters. The pressure drop testing setup is illustrated in FIG. 7 and includes vacuum pump 150, throttle valve 152, flow meter 154 and pressure gauge 156 connected in series. Control values of pressure drop versus flowrate through the system, without device 10 in place, were measured over a range of up to 41 liters per minute. Device 10 was then attached upstream of the pressure gauge and the pressure drop versus flowrate through the system measured again. The pressure drop through device 10 was then calculated by subtracting the control pressure drops from the test pressure drops at each given flowrate. The corrected data showing about ½ inch of water pressure drop at 10 lpm across a single device 10 is reported in FIG. 6.

Figure 8:
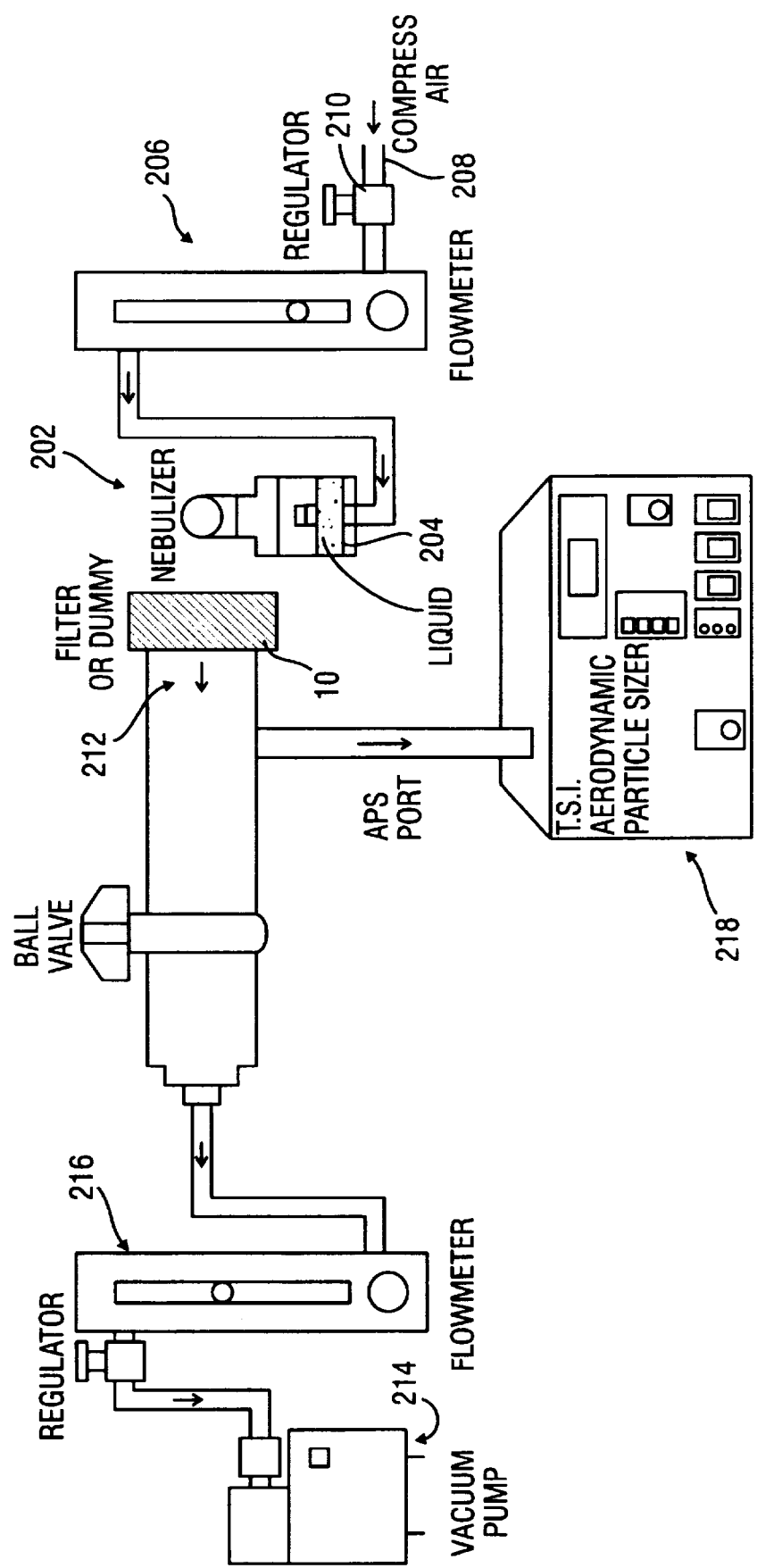
FIG. 8 is a filter collection efficiency setup used to test filters of the present invention.
Figure 8A:
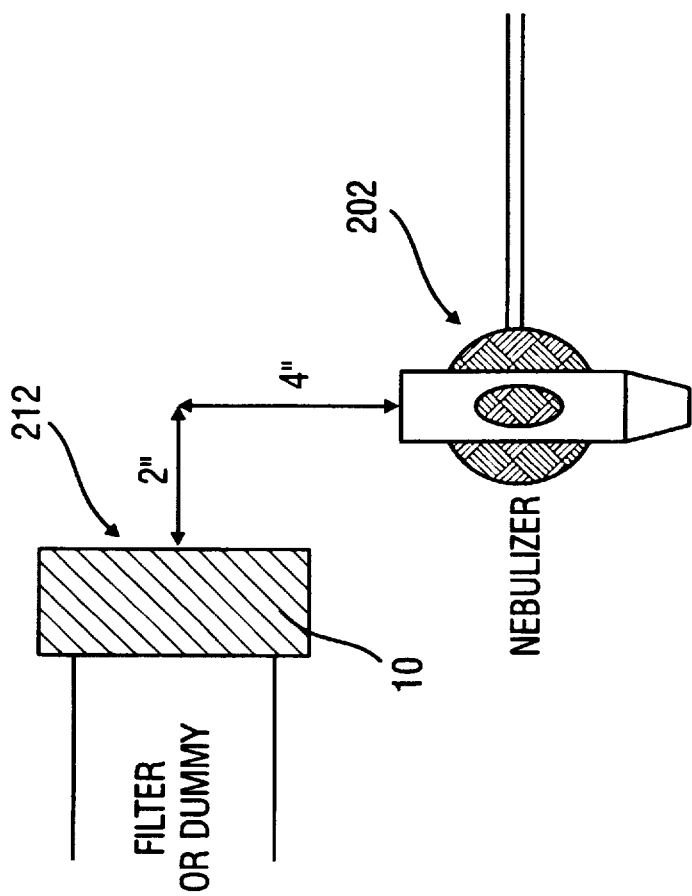
FIG. 8a is a plan view of the test port and neublizer of FIG. 8.

The efficiency of device 10 to capture particulate matter was determined by nebulizing liquids and measuring the droplet concentrations drawn into a tube without and with device 10 in place. FIG. 8 best illustrates the setup and interconnection of components utilized for this test. A nebulizer 202 having a reservoir 204 filled with a test liquid, such as corn oil or Roundup, is connected through a flow meter 206 to a compressed air line 208. When regulator 210 is opened, the test liquid is dispersed in droplets in front of test port 212, as best shown in FIG. 8a. A sampling and filtering device 10 may be attached to port 212 to test the device, or port 212 may be open to collect control values. Connected to port 212 are a vacuum pump 214, flow meter 216 and an aerodynamic particle sizer 218.

Figure 9:
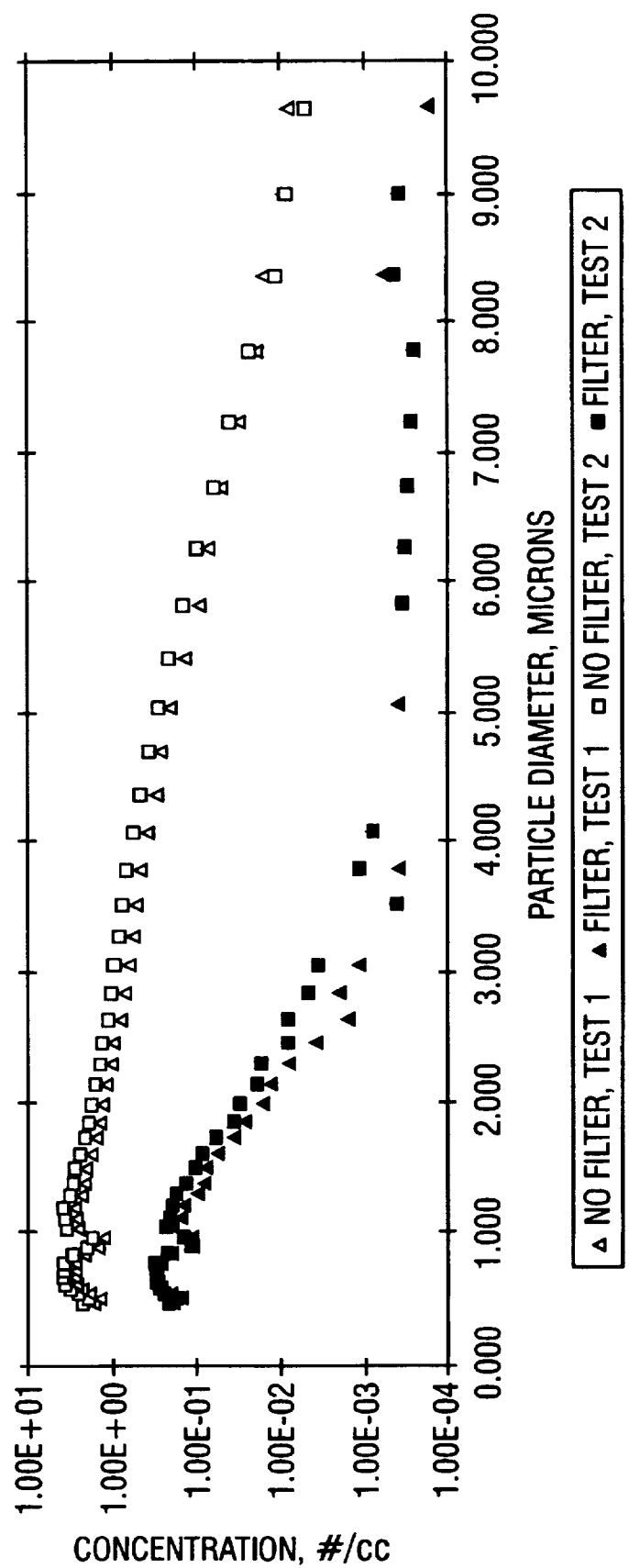
FIG. 9 is a graph of particle size versus concentration for an Alachlor filter of the present invention.
Figure 10:
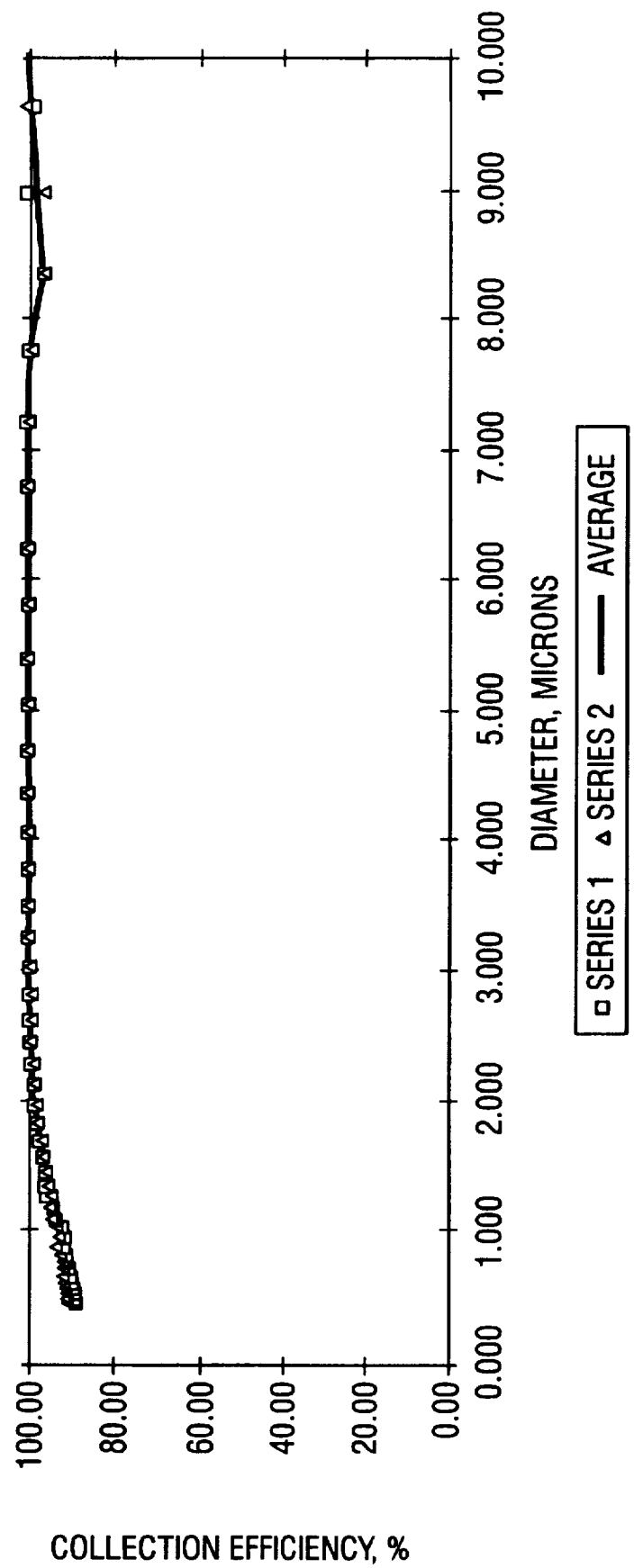
FIG. 10 is a graph of particle size versus collection efficiency for an Alachlor filter of the present invention.

As reported in FIG. 9, at least a tenfold decrease in particle concentration was observed over the respirable range of diameters (about 0.5 to 10.0 microns) when device 10 is compared with the same system without a filter. The data reported in FIG. 9 is also reported in FIG. 10 as collection efficiency versus particle diameter. FIG. 10 illustrates that 90% to 100% of particles in the respirable range of diameters are collected by device 10. In particular, in two separate studies represented by Series 1 and Series 2, sampling and filtering device 10 trapped about 90% of particles between about 0.5 to 2.0 microns and about 100% of particles between about 2.1 to 10.0 microns. These data show that the silica gel layer is an effective particle trapping matrix.

Figure 11:
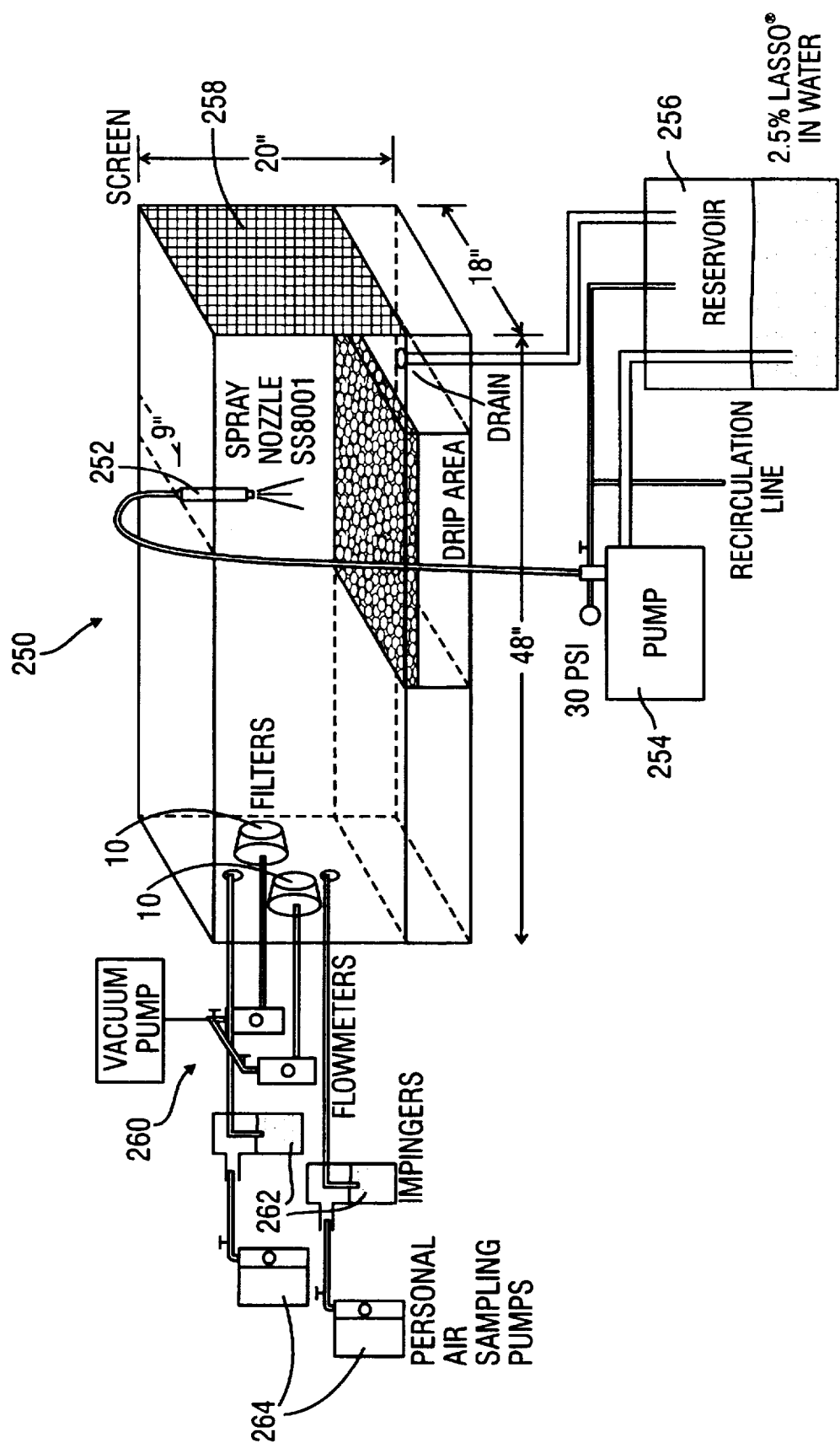
FIG. 11 is a test setup for comparing filters of the prevent invention with prior art impingers.

In addition, device 10 was tested as a sampler and the results were compared with an impinger type personal sampler. The test setup for this experiment is shown in FIG. 11 and includes a chamber 250, spray nozzle 252, pump 254 and reservoir 256. In this test, a 2.5% solution of Lasso® was sprayed using an SS8001 nozzle from Spraying Systems, Inc., Wheaton, Ill. The 2.5% solution of Lasso® is a commonly used spray concentration in the field. The Lasso® was mixed with air drawn through screen 258, and drawn into two devices 10 by vacuum pumps 260 at 12 lpm each. Simultaneously, the Lasso® solution was drawn through the impingers 262 by vacuum pump 264 at 1 lpm each.

Figure 12:
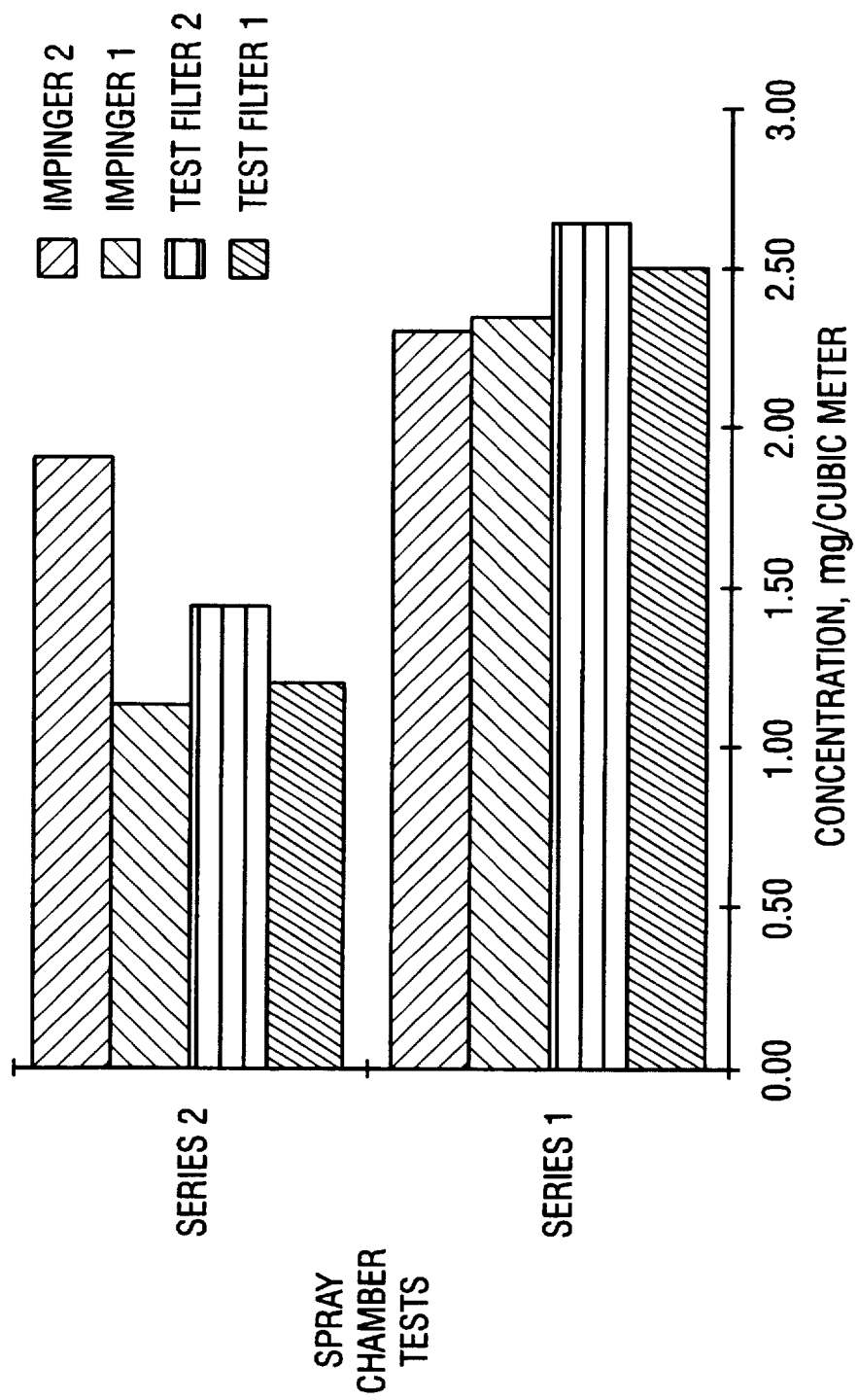
FIG. 12 is a comparison of mass concentrations collected by filters of the present invention and by prior art impingers.

Devices 10 and the impingers were then chemically analyzed for the quantity of Alachlor, the active ingredient in Lasso®. The results for two separate studies represented by Series 1 and Series 2, reported in FIG. 12, show very favorable comparison of devices 10 as samplers with the impingers. The studies show that Alachlor is recovered from the silica when methanol is used as a solvent.

EXAMPLE 2

In another embodiment of the present invention, the filtering media are designed to collect Glyphosate. As best shown in FIG. 5, device 100 include several fiberglass pads 102, 104, 106, 108, and 110 which are the primary filtering and collection media. A mist pad 112 is also provided to filter out wet vapor. As shown in FIG. 5, the device 100 includes first end member 136, second end member 114, spacers 120, 126 and 132 and screens 116, 118, 122, 124, 128, 130, and 134. Members 114 and 136 and spacers 120, 126 and 132 may be annular members provided with several through holes or threaded holes equally spaced about the periphery thereof. Second end member 114 and spacers 120 and 132 are ⅛ inch thick, while spacer 126 is ¼ inch thick. First end member 136 includes mask adapter 138.

Device 110 is held together in a fashion similar to device 10 described above. Connecting members 140 and 142 extend from spacer 114 and from spacer 136 to allow disassembly and removal of individual layers of device 100 without disassembly of the whole device 100.

Pressure drop and filtering efficiency tests were also conducted on the Glyphosate devices 100. The pressure drop data reported in FIG. 13 shows a pressure drop across a single sampling and filtering device 100 of approximately 0.30 inches of water column pressure at 10 lpm of air flow. This is a very low pressure drop and allows the wearer to breathe through device 100 without significant adverse affects to respiration, even during mild exercise. Collection efficiency data for the device 100 is reported in FIG. 14 and shows about 90% to 100% collection for particle diameters in the respirable range of diameters.

As shown by the test results for the two examples above, the combined sampling and filtering devices of the present invention provide good filtering characteristics as well as good sampling characteristics. In addition, because the combined sampling and filtering devices measure actual human respiratory exposure, thereby requiring no data reduction, analysis of human exposure rates from the devices is more accurate. The combined sampling and filtering devices of the present invention also provide structural flexibility allowing selective removal of any single layer of sampling and/or filtering media for laboratory analysis without requiring complete disassembly of the device.

While this invention has been described as having a preferred design, it is understood that it is capable of further modifications, uses and/or adaptations, following the general principle of the invention and including such departures from the present disclosure as come within known or customary practice in the art to which the invention pertains, and as may be applied to the central features set forth above, and fall within the scope of the invention of the limits of the appended claims.

I claim:

1. A combined sampling and filtering device, comprising:
 a first end member;
 a second end member in operative alignment with said first end member;
 first sampling and filtering means positioned intermediate said first and second end members and in operative alignment therewith;
 first adjustable threaded connecting means for engaging said first and second end members and said first sampling and filtering means and wherein said first connecting means passes entirely through said first sampling and filtering means and said first and second end members, and is adjustably removable therefrom; and
 second adjustable threaded connecting means for engaging said first and second end members and said first sampling and filtering means and wherein said second connecting means passes entirely through said first sampling and filtering means and said first and second end members, and is adjustably removable therefrom.

2. The device of claim 1, further comprising second sampling and filtering means positioned intermediate said second end member and said first sampling and filtering means such that adjustment of said first and second connecting means in opposing directions allows for removal of any one of said first and second end members or said first and second sampling and filtering means without removal of any of the other of said first and second end members or said first and second sampling and filtering means.

3. The combined sampling and filtering device of claim 2, wherein said first and second sampling and filtering means includes a plurality of screen members, at least one spacer member and sampling and filtering media.

4. The combined sampling and filtering device of claim 3, wherein said sampling and filtering media includes a plurality of silica gel layers and a HEPA pad.

5. The combined sampling and filtering device of claim 4, wherein said sampling and filtering media includes a plurality of fiberglass pads and a mist pad.

6. The combined sampling and filtering device of claim 1, wherein said threaded connecting means are screws.

7. The device of claim 1, wherein each of said first and second end members and said first sampling and filtering means include holes located about the periphery thereof for slidably engaging said first and second connecting means therewith.

8. The device of claim 7, further including:
 first retaining means for maintaining said first connecting means in engagement with an end member; and
 second retaining means for maintaining said second connecting means in engagement with an end member.

9. The device of claim 1, wherein said second end member includes a filter mask adapter.

10. The device of claim 9, further comprising a mask adapted to be placed over at least the nose and mouth of a wearer, the mask having at least one aperture therein adapted to receive and engage the filter mask adapter.

11. The mask of claim 10, wherein air inhaled by a wearer passes through said sampling and filtering device at a flow rate measured in liters per minute, the resistance to airflow of said sampling and filtering device is quantified as a pressure drop measured in inches of water column pressure, and said pressure drop is less than about 0.0558 times said flow rate.

12. A combined sampling and filtering device, comprising:
 a first end member;
 a second end member in operative alignment with said first end member and including a filter mask adapter;
 first sampling and filtering means positioned intermediate said first and second end members and in operative alignment therewith;
 second sampling and filtering means positioned intermediate said second end member and said first sampling and filtering means;
 wherein said first and second sampling and filtering means includes a plurality of screen members, at least one spacer member and sampling and filtering media;

first adjustable threaded connecting means for engaging said first and second end members, and wherein said first connecting means passes entirely through said first and second sampling and filtering means and said first and second end members, and is adjustably removable therefrom; and second adjustable threaded connecting means for engaging said first and second end members, and wherein said second connecting means passes entirely through said first and second sampling and filtering means and said first and second end members, and is adjustably removable therefrom;

wherein each of said first and second end members and said first and second sampling and filtering means include holes located about the periphery thereof for slidably engaging said first and second connecting means therewith; and wherein adjustment of said first and second connecting means in opposing directions allows for removal of any one of said first and second end members or said first and second sampling and filtering means without removal of any of the other of said first and second end members or said first and second sampling and filtering means.

* * * * *